United States Patent [19]
Bushroe

[11] Patent Number: 5,257,051
[45] Date of Patent: Oct. 26, 1993

[54] METHOD AND APPARATUS FOR ADJUSTING THE OPTICAL ALIGNMENT OF A FILM PROJECTION SYSTEM

[75] Inventor: Frederick N. Bushroe, Redondo Beach, Calif.

[73] Assignee: The Walt Disney Company, Burbank, Calif.

[21] Appl. No.: 996,670

[22] Filed: Dec. 24, 1992

[51] Int. Cl.$^5$ ............................................. G02B 11/26
[52] U.S. Cl. ................................ 353/122; 356/153; 356/123
[58] Field of Search ............... 356/153, 154, 152, 123, 356/253, 254, 255; 353/95, 96, 28, 122, 120, 87; 33/286, 288

[56] References Cited
U.S. PATENT DOCUMENTS

| | | | |
|---|---|---|---|
| 3,043,184 | 7/1962 | Fitzgerald et al. | 356/123 |
| 3,389,632 | 6/1968 | Plummer . | |
| 3,718,398 | 2/1973 | Becraft et al. | 356/153 |
| 3,915,575 | 10/1975 | Sick | 356/152 |
| 4,145,141 | 3/1979 | Noble | 356/123 |
| 4,452,532 | 6/1984 | Grollimund et al. | 356/154 |

*Primary Examiner*—William A. Cuchlinski, Jr.
*Assistant Examiner*—William C. Dowling
*Attorney, Agent, or Firm*—Pretty, Schroeder, Brueggemann & Clark

[57] ABSTRACT

A method and apparatus for adjusting the optical alignment of a film projection system of the type having a film gate with a central opening, a lens mount having lenses optically aligned along an optical axis of the lens mount, a light source and a generally ellipsoidal collector for reflecting light from the light source along an optical axis of the collector. The method and apparatus utilize a laser light source which is inserted in the position normally occupied by the lenses and a beam splitter which splits the beam of laser light into a center beam and two inclined side beams. An intercept sheet is temporarily placed in the path of the center beam and reflections of the side beams from the interior surface of the collector to create images of the center beam and the reflected side beams on the intercept sheet. By adjustment of the position and tilt of the collector, the images of the center beam and the reflected side beams on the intercept sheet can be brought into coincidence, thereby bringing the optical axes of the collector, the film gate and the lens mount into coincidence with a system optical axis in which the illumination is centered upon the opening through the film gate and distributed evenly over it, with the film gate centered with the optical axis of the projection lens assembly.

12 Claims, 3 Drawing Sheets

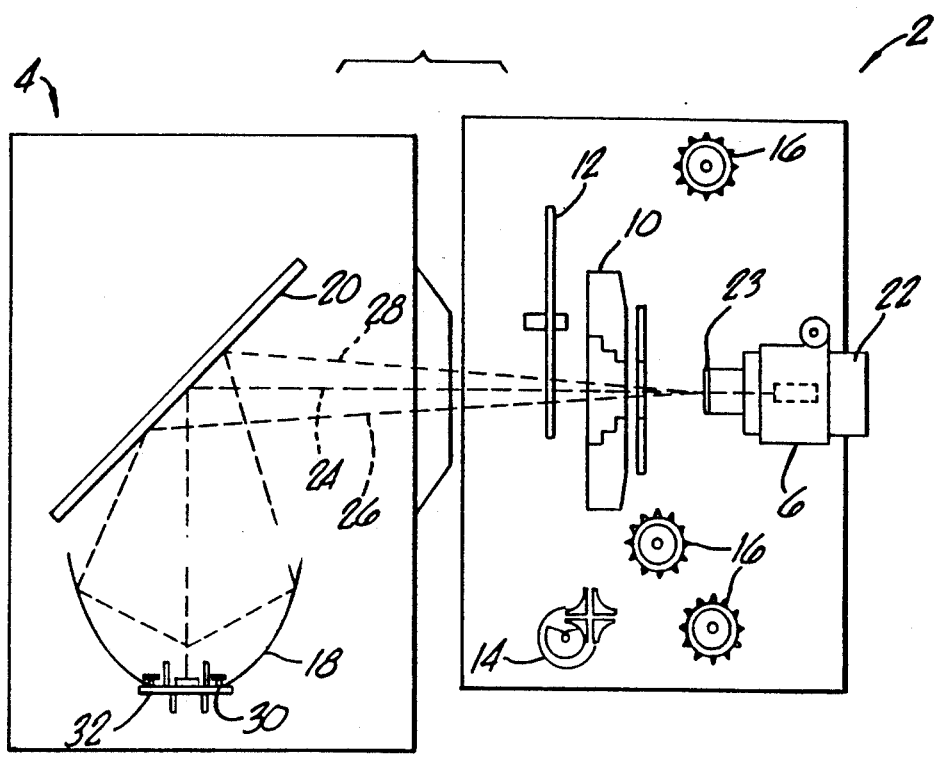
fig. 1.
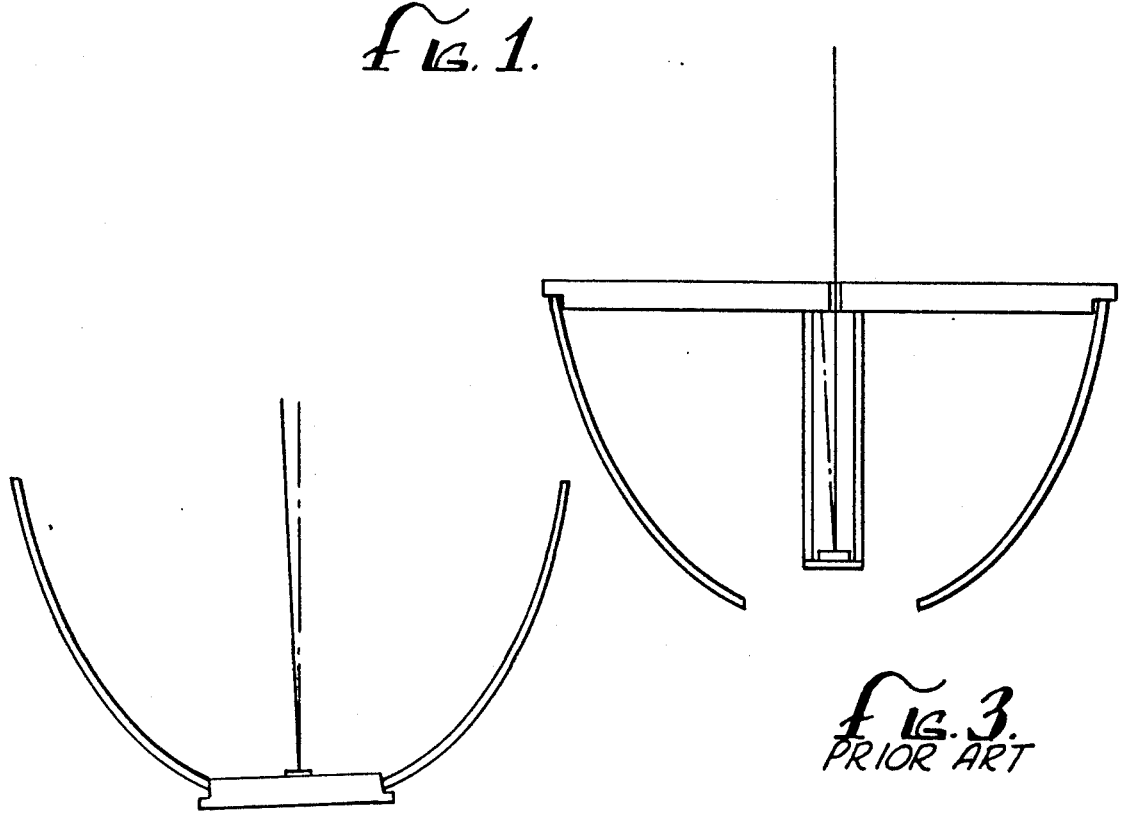
fig. 3.
PRIOR ART
fig. 2.
PRIOR ART

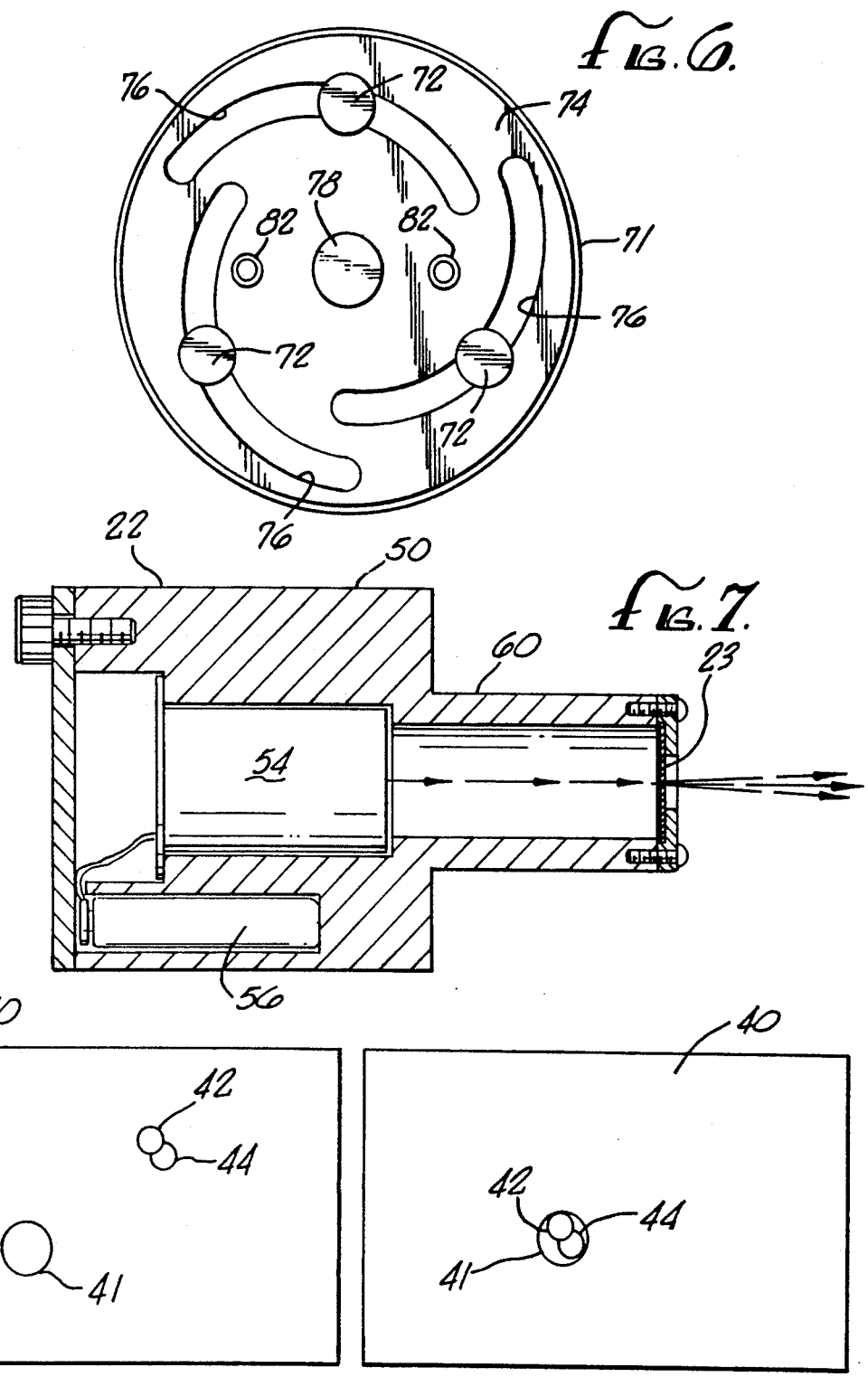

METHOD AND APPARATUS FOR ADJUSTING THE OPTICAL ALIGNMENT OF A FILM PROJECTION SYSTEM

FIELD OF THE INVENTION

This invention relates to the optical alignment of film projection systems. In particular, it relates to a method and apparatus for aligning the optical paths in a film projection system of the type which uses a light source and reflective collector to illuminate a film gate and a projection lens assembly.

BACKGROUND OF THE INVENTION

Film projection systems used in commercial applications, such as movie theaters or theme parks, typically include a lamp house and a projector head. The projector head houses a projection lens assembly for projecting a focussed image upon the screen. The lens assembly is positioned close to a film gate which positions the film precisely in relation to the optical axis and focal point of the lens assembly as the film is advanced frame by frame past the gate. The lamp house houses the light source, typically an electric light, positioned near the focal point of a reflective collector. Nowadays, the collector is usually in the shape of the lower part of an ellipsoid or a sphere.

In a commercial projection system, alignment is critical for three optical components: the collector, the film gate, and the lens mount. Each of these components has an optical axis. When the optical axis of each of these components is collinear, the system optical axis is established. It is necessary that the optical axis of the collector, the optical axis of the film gate, and the optical axis of the lens mount, all lie along the system optical axis for proper projection system alignment.

The optical axis of each component can be misaligned with respect to the system optical axis in three ways: it can be off center, it can be tilted, or it can be off center and tilted.

In many modern projectors, a folded projection system is employed. In the folded projection system, a flat mirror is used to fold the system optical axis. Typically the flat mirror is inclined at 45° and is called the folding mirror. The folding mirror is positioned centrally over the light source and collector. Through reflection, the folding mirror bends the system optical axis 90°.

In commercial projection systems, it is very important that the light from the light source and collector should be directed evenly and centrally over the opening through the film gate. If the collector is misaligned off center or tilted relative to the optical axis of the film gate or relative to the optical axis of the projection lens, the illumination across the film gate will not be uniform and the quality of the projected image viewed by the audience will be visibly unsatisfactory. Misalignment can be, for example, a particular problem in multiscreen projection where different projectors are projecting edge-to-edge images on adjacent screens, since a noticeable difference in light intensity across the edges of two adjacent screens, caused by improper alignment of the light source in one of the projecting systems, will undermine the impression of a seamless panorama that the audience is intended to experience. Accordingly, it is important to be able to adjust a film projection system to overcome any optical misalignment that may exist.

An early technique for correcting misalignment simply used a taut string stretched along the optical path to align the components. This technique was used in projection systems that were not folded. The lamp constituting the light source would be temporarily removed from its socket and a string would be attached to the middle of a plate placed in the center of the collector's lamp hole directly through a centered aperture in the film gate to the middle of a plate centered in the mount for the lens assembly. The string was drawn tight so that the various parts could be aligned directly with reference to the datum provided by the taut string. With the advent of folded projection systems, however, the string method was no longer functional because the string cannot represent the system optical axis, since the optical axis is reflected through a 90° change of direction by the folding mirror.

Alternative techniques were developed for folded projections systems based upon the use of a laser beam to achieve the desired alignment. One such prior art technique, shown in FIG. 2, involved the use of an a.c. powered helium neon laser that was aligned with the lens mount assembly, with the lens assembly removed. (This system was developed by the assignee of the present application, The Walt Disney Company.) The laser directed a laser beam along the optical axis of the lens mount, through the film gate, to the folding mirror which reflected the beam to the collector. A mechanical target/mirror assembly was installed in the lamp hole at the base of the collector. The target had a mirror with the center of the collector indicated by a reflective cross engraved upon the mirror. The target was installed to place the center of the cross at the center of the optical axis of the collector. However, there was no way to determine that the target was not tilted with respect to the optical axis of the collector. By adjusting the position of the collector within the lamp house, in a plane perpendicular to the incident laser beam, the cross on the target could be moved beneath the spot of light produced by the incident laser beam. This centered the collector relative to the optical axis of the lens mount. An attempt to correct tilt of the collector was made by tilting the collector and target assembly until the reflected beam from the target was coincident with the incident beam. This method of removing collector tilt was inaccurate since the target/mirror assembly used the lamp hole as a datum that is perpendicular to the collector's optical axis. While a collector's lamp hole is centered well enough for alignment purposes, the plane that the lamp hole lies in is not perpendicular to the optical axis. The tilt angle of the plane that the lamp hole lies in is large enough to cause significant misalignment. This hole is not precision machined or formed. It is ground to remove edges after the collector is formed during manufacturing. This angle varies significantly even amongst collectors of the same model.

While this approach helped in achieving better alignment, it failed to solve one significant problem. Although the optical axis of the collector was now properly centered, it might be tilted relative to the optical axis of the lens mount, leaving significant misalignment uncorrected.

The next refinement in the prior art, dependent upon the use of a laser beam for alignment, is shown in FIG. 3. In this technique, the upper peripheral edge of the collector must be made with a lip precisely formed to lie in a plane perpendicular to the optical axis of the collector. An alignment tool is placed on this lip, having a cross bar of the correct diameter to fit onto it. The cross bar is made of transparent material and has a pin hole at its center. Underneath and surrounding the pin hole is a transparent cylinder supporting a target mirror perpendicular to the optical axis of the collector. To use this system, an a.c. powered helium neon laser projects a laser beam along the first optical path to the mirror which reflects the beam downwardly through the pin hole onto the target mirror which would reflect the beam back up towards the pin hole. If the collector and the mirror are tilted relative to each other, the beam reflected from the target mirror will strike the plastic surrounding the pin hole, providing a visual indication of misalignment. The tilt of the collector can then be adjusted until the laser beam reflected by the target is aligned with the pin hole.

While the system of FIG. 3 provides some improvement, it still has very significant limitations. A particularly severe limitation is that it depends upon the manufacture of a specially configured lip on the upper peripheral surface of the collector, precisely configured to lie in a plane perpendicular to the optical axis of the collector. Such lips are not found on the great bulk of collectors in film projection systems already installed around the country nor are they present on most collectors currently manufactured. While a few collectors may have their upper rim in a plane precisely perpendicular to the optical axis of the collector, many others do not. Without knowing, for each collector, whether this is the case, a method of adjustment that depends upon this relationship being present cannot be relied upon. Another severe limitation is that, so far as is known, the adjusting tool of the prior art was made in only one diameter size. Since a typical operator of multiple film projection systems will possess collectors having a variety of different diameters in his inventory of systems, each different diameter collector would require a separately constructed aligning tool of different diameter.

Thus, at the present time, need exists for a method and apparatus for optically aligning film projection systems which is of widespread application to collectors without limitation whether the upper edges of the collectors have been cut in a plane that is accurately perpendicular to the optical axis of the collector and without limitation to a unique collector diameter.

SUMMARY OF THE INVENTION

The method and apparatus of the present invention are intended for adjustment of the optical alignment of a film projection system having a film gate, a lens mount which houses a projection lens assembly, a light source, and a generally ellipsoidal collector for reflecting light from the light source along the system optical axis. A folding mirror may be used between the collector and the film gate to fold the system's optical axis at an angle, typically a right angle.

The optical axes of the lens mount, the film gate, and the collector, when they are correctly adjusted so that the gate opening is centered with respect to the optical axes of the lenses in the lens mount and the illumination from the light source and collector is centered upon the gate opening and evenly distributed over it, form a system optical axis. Without a folding mirror, the system optical axis is a straight line. With a folding mirror, the system optical axis has a bend in it. Specifically, the optical axes of the gate and the lens mount are aligned and centered with respect to each other and they are inclined to the optical axis of the collector by the angle of reflection caused by the folding mirror, most commonly a right angle.

The present invention provides a method and apparatus for adjusting the optical alignment of such a film projection system which is intended to solve the problems which have been described. In particular, it is intended to provide a method and apparatus for optical alignment of the film projection system which is not limited to use on collectors that have already been provided with a peripheral edge lying in a plane calibrated to be perpendicular to the optical axis of the collector. Moreover, the invention is not limited to collectors of one particular diameter but can be applied to collectors of different diameters without requiring separate aligning apparatus for each different diameter.

In the practice of the method, the light source is removed from the collector and a target is placed inside the base of the collector with a center marking on the target coincident with the optical axis of the collector. A laser beam is projected in alignment with the optical axis of the lens mount onto the folding mirror and is reflected by it onto the target. The laser beam is split by a beam splitter into a central beam aligned with the optical axis of the lens mount, and at least two side beams that diverge at equal angles of inclination from the central beam on its opposite sides. The side beams reflect successively from the folding mirror and from interior reflecting surfaces of the collector.

The position of the collector is first adjusted, in a plane perpendicular to the center beam, to move the center marking of the target into coincidence with a spot of light produced on it by the center beam reflected from the folding mirror. This step centers the collector relative to the optical axis of the lens mount. Next, an intercept sheet is temporarily placed in the reflected paths of the side beams from the collector and the center beam from the folding mirror to create visible side beam light spots and a center beam light spot on the intercept sheet. By adjusting the relative tilt of the collector and the folding mirror, the side beam light spots are moved into coincidence with the center beam light spot on the intercept sheet. This adjustment brings the optical axes of the collector, the gate and the lens mount into coincidence with the system optical path needed to provide centered even illumination of the opening through the film gate in optical alignment with the lens mount. Thereafter, when the light source is replaced and centered by conventional adjusting means, the collector will direct light to the folding mirror and be reflected in alignment with the optical axis of the film gate and the optical axis of the lens mount to achieve properly centered and even illumination across the film gate and the image.

The method of this invention, and the apparatus used to implement it, do not require that the peripheral edge of the collector shall have been manufactured to lie in a plane perpendicular to the collector's optical axis nor are they dependent upon the collector having a particular diameter. Because these limitations do not exist, the method and apparatus of the present invention offer a range of application to a greater diversity of film projection systems than prior art alignment systems. The elimination of these limitations is expected to be of great significance to an operator of a number of movie theaters, or an operator of theme parks, having a large number of film projection systems having differing collector shape sizes and geometry.

In a preliminary step of the method, the center beam of the laser is also used to center the central axis of the lens mount with the center of the film gate. The projection lens assembly is temporarily removed from the lens mount and is replaced with a laser alignment tool containing a laser beam source which is precisely centered, in relation to the diameter of the housing, to ensure that when the housing is placed in the lens mount, the laser beam will be aligned with the central optical axis of the lens mount. An aperture blank is temporarily placed in the film gate with a cross marked on its center point. The laser beam is directed onto the aperture blank and the position and inclination of the lens mount are adjusted relative to the projector housing to bring the laser beam into coincidence with the cross marked at the center point of the aperture blank. Thus, the film gate is centered with respect to the lens mount. After the lens mount and film gate have been accurately aligned in this way, the aperture blank is then removed.

The apparatus by which the method is accomplished, according to the present invention, includes the previously-mentioned target surface. This target surface is opaque and nonreflective. It is installed in the collector's lamp hole, after the light source has been temporarily removed for purposes of the adjustment of alignment. In one simple form, it may comprise a sheet of paper or card of circular shape sized to fit the socket and having a center marking, such as a cross. The target is taped or otherwise attached to the collector with the center marking in coincidence with its optical axis. In the preferred embodiment of the target, described subsequently, a circular target housing is provided with three equally spaced pins on its upper surface which can be moved radially in and out to grip the edges of the collector and fasten the target housing concentrically within the lamp hole area.

The apparatus of the present invention also includes the laser source. In the preferred embodiment, the laser source is mounted in a housing which is shaped to slide into the interior of the lens mount. The housing supports the laser source with the laser beam aligned along the central optical axis of the housing. To use the apparatus, the projection lens is simply removed from the lens mount and the housing of the laser source is inserted in its place in the lens mount.

In the preferred embodiment, the laser source that is used is a low voltage laser diode of the type referred to as a class II laser which provides a beam that does not require the wearing of safety eye protection. It is powered by a battery, typically a nine-volt battery of the type used for powering transistor devices. Space is provided in the housing to receive the battery for the laser source.

The housing also performs another function, namely to support the beam splitter, also forming a part of the apparatus. In the preferred embodiment, applicant uses a diffraction grating mounted in the housing, in the path of the laser beam, to accomplish the function of dividing the beam into a central beam aligned with the first optical path and the two side beams divergent at equal angles on opposite sides from the center beam. Although the diffraction grating typically produces further sets of side beams of progressively increasing angle of divergence, only the first set of side beams is used in the invention for the purposes that have been described. The angle of divergence of the first set of side beams is selected to be such that, after they have successively reflected from the folding mirror and the interior surfaces of the light source collector, they will strike the intercept sheet at a sufficient angle to be sharply defined so that they may be moved into coincidence with the spot of light on the intercept surface created by the center beam.

DESCRIPTION OF THE DRAWINGS

The method and apparatus of the invention, according to the preferred embodiment, are illustrated in the accompanying drawings, in which:

FIG. 1 is a diagrammatic side view of a lamp house and projector head showing the principal components of a typical projection system, with portions of the apparatus of the present invention installed for adjusting the alignment of the system;

FIG. 2 is a simplified representational side view of a prior art alignment adjustment apparatus used by The Walt Disney Company, assignee of the present application;

FIG. 3 is a simplified representational view of another prior art system known to applicant, using a special alignment tool;

FIG. 6 is a plan view of the target shown in FIG. 5 from the underside;

FIG. 7 is a cross-sectional side view of a laser alignment tool, forming a part of the apparatus of the present invention;

FIG. 8 shows the intercept sheet with the center beam light spot and the side beam light spots in the position they occupy when the optical axis of the collector is misaligned with the optical path required to center the projected light correctly on the film gate; and FIG. 9 shows the intercept sheet when the center beam light spot and the side beam light spots have been moved into coincidence.

DETAILED DESCRIPTION

Figure 4:
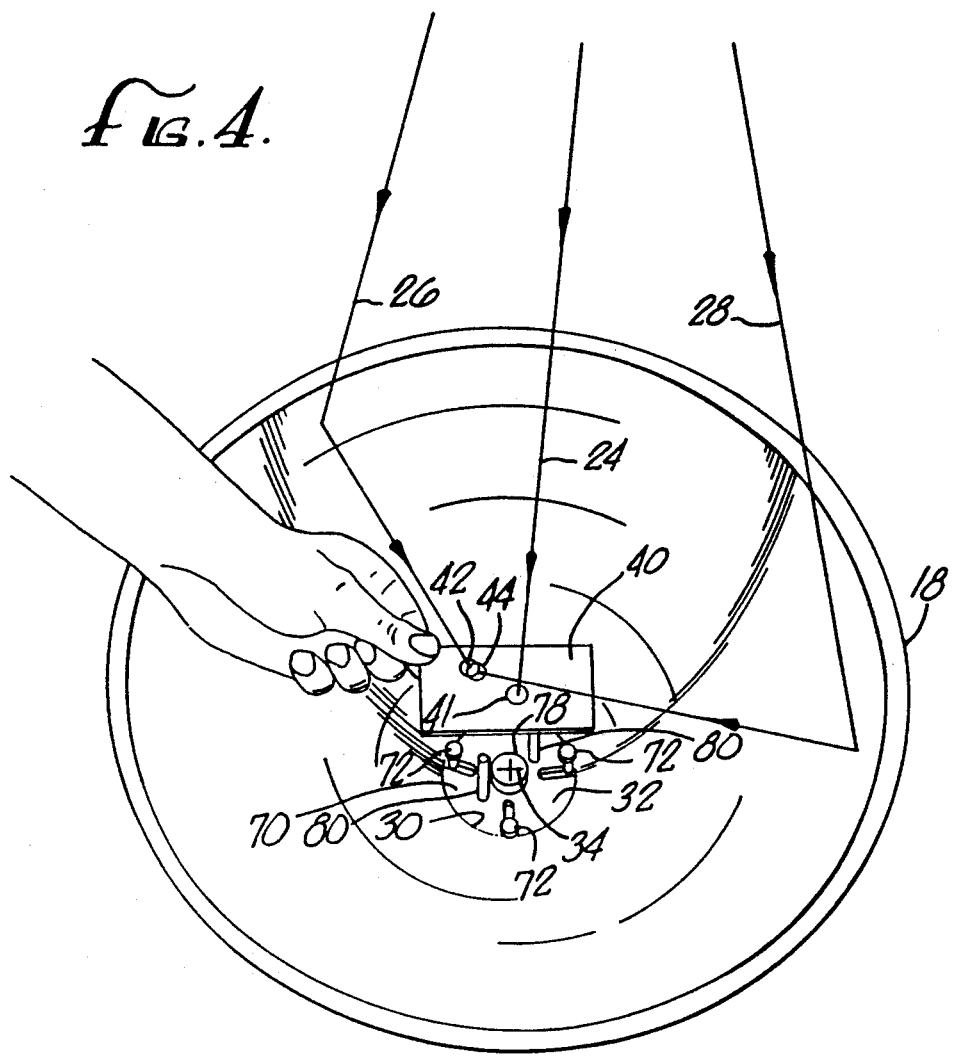
FIG. 4 shows the use of an intercept sheet in the alignment adjustment method of the preferred embodiment of the present invention.

The method and apparatus of the present invention are intended for use with a film projection system of the type shown in FIG. 1. The film projection system includes a projector head, generally designated 2, containing the film moving and optical parts of the projector, and a lamp house, generally designated 4 which provides illumination. Within the projector head, there is a lens mount 6 which normally supports the projection lens assembly (not shown) which is temporarily removed for practice of the alignment method of the present invention. When the projection lens assembly is installed in the lens mount, it has an optical axis, aligned with the cylindrical center optical axis of the lens mount 6, which extends in one direction to the projection screen and, in the opposite direction, centrally through a conventional film gate 10. The projector includes a shutter 12, a film advance mechanism 14 and film sprockets 16 for advancing movie film intermittently, frame by frame, past the gate, in synchronism with the operation of the shutter, in a well known manner. The lamp house 4 houses a generally ellipsoid collector 18 with its optical axis directed vertically. A conventional light source, such as a high intensity electric lamp, is situated at the focal point of the collector. Light from the light source is reflected upwardly to a folding mirror 20 which reflects the light rays through a 90° change of direction to illuminate each frame of film as it passes through the film gate 10.

In this conventional type of film projection system, it is important for the quality of the projected image observed by the viewer on the projection screen, that the light from the light source and collector be accurately centered on the film gate and aligned with the system optical axis through the gate and projection lens assembly. If the mirror 20 and the collector 18 have some misalignment relative to each other, the light from the light source will not be directed in registry with the system optical path causing the illumination to be uneven across the width or height, or both, of the gate. This uneven illumination is distracting to the viewer of the film. It can also lead to color fringing effects which further degrade picture quality. Where multiple projection systems are being used, for example, in panoramic projection using multiple screens, unequal illumination intensity across the width of a projected picture is particularly apparent at the edges of adjacent projected pictures, destroying the illusion of a seamless panorama that the multiple projection technique is intended to create.

The method and apparatus of the present invention are intended for adjustment of the optical alignment of the film projection system to ensure that the light from the light source and collector is correctly aligned with the optical path extending through the film gate and coinciding with the optical axis of the projection lens assembly. The term system optical axis will be used to describe an optimum arrangement formed by the optical axis of the collector and the optical axes through the opening in the film gate and the lens mount which exists when the light from the light source and collector is centered upon the gate opening and directed uniformly across it with the gate having its optical axis aligned with the optical axes of the lenses in the lens mount. Without a folding mirror, the system optical path is a straight line. With a folding mirror, the system optical path has a bend in it.

In practicing the method of the present invention, the projection lens assembly is removed from the projector head and replaced by a laser alignment tool 22 providing a laser beam. As will shortly be described, the laser beam is passed through a beam splitter 23 which splits the laser beam into a center beam 24 and two side beams 26 and 28. The laser alignment tool 22 directs the center beam 24 in alignment with the optical axis of the lens mount through the center of the film gate 10 onto the mirror which reflects it downwardly into the collector 18. Before beginning the alignment method, the light source will have been temporarily removed from its light socket, leaving a circular opening 30 through the base of the collector. A target 32 is mounted in or across the socket opening 30 for practice of the alignment adjustment method. The target bears a center marking 34, in the form of a cross, and is attached to the collector with the center marking coincident with the collector's optical axis.

To commence the adjustment method, the laser alignment tool is slid into the lens mount 6, in place of the removed projection lens assembly. As will later be described, the structure of the laser alignment tool is such that, when slid into place, the center laser beam will be aligned with the optical axis of the projection lens assembly. An aperture blank sized to fit in the aperture of the gate is then placed in the gate aperture. The aperture blank is marked with a marking, in the form of a cross at its center point. The lens mount is adjusted by using shims or spacers until the center laser beam 24 coincides with the center marking on the aperture blank. The aperture blank is then removed, permitting the center laser beam 24 and the side beams 26 and 28 to pass through and be incident upon the mirror 20.

Next, the position of the collector in the lamp house must be adjusted to center its optical axis relative to the optical axis of the lens mount. To achieve this adjustment, the collector, with the target 32 in place, is moved by conventional mechanisms connecting it to the lamp house, in a plane perpendicular to the center laser beam 24 to bring the center marking 34 on the target into coincidence with the spot of light produced by the center laser beam 24. When this has been done, the collector's optical axis will have been correctly centered.

At this point, although centered, the optical axis of the collector 18 may nonetheless be tilted out of alignment with the optical axis of the lens mount. In this event, when the light source is restored, the light would be reflected by the mirror 20 in an off center relation to the gate 10 and lens mount 6. It is, therefore, necessary to correct for misalignment of tilt.

For this purpose, the laser alignment tool also includes the previously-mentioned beam splitter 23. The angle of inclination of the side beams 26 and 28 to the center beam 24 is selected to be such that both side beams 26 and 28 will be incident upon the mirror 20 and reflected by it downwardly and divergently to be incident upon interior reflecting surfaces of the collector 18. Both side beams will reflect from the interior surfaces of the collector 18 to a point of coincidence with each other. Correction of any misalignment in the tilt direction is achieved by using the reflections of the side beams in conjunction with the reflection of the center beam.

To achieve correction of tilt, an intercept surface 40 is placed in the reflected path of these reflected center and side beams. The intercept surface can simply be a small sheet of opaque card, or translucent material, for example, a business card, held manually in position during the adjustment. The intercept surface 40 is held, by hand or other means, far enough into the collector 18, to pick up a center beam light spot 41 created by the center laser beam 24 and side beam light spots 42 and 44 created by the reflections of the side beams 26 and 28 from the interior reflecting surfaces of the ellipsoid collector 18, respectively. If the optical axis of the collector 18 is tilted out of alignment with the optical axis of the lens mount defined by the reflection of the center beam 24, the side beam light spots 42 and 44 visible on the intercept surface 40 will be spaced from the center beam light spot 41, as shown in FIG. 8. By adjustment of the mechanism which mounts the collector 18 to the lamp house, the tilt of the collector is adjusted to move the side spot reflections into coincidence with the center beam light spots, as shown in FIG. 9 thereby tilting the optical axis of the collector, its optical axis and the optical axis of the lens mount to coincide with the system optical path.

It will be appreciated that this method of alignment utilizes the interior reflecting surfaces of the collector to achieve tilt alignment of the optical axis of the collector with the optical path that the light must follow if it is to be accurately centered on the gate. This method is, therefore, superior to the prior art method shown in FIG. 3 which relies on first manufacturing a precise mechanical relationship between the optical axis of the collector and the plane in which the upper peripheral edge of the collector lies and later using that mechanical relationship as the basis for a laser beam alignment technique. In contrast, applicant uses the optical surfaces of the collector itself in the alignment adjustment method, thereby eliminating the need for any precise manufacturing relationship between the peripheral edge of the collector and a plane perpendicular to the collector's optical axis.

The apparatus used to implement the method of the present invention includes the previously-referred to laser alignment tool 22 which is shown in more detail in FIG. 7. The laser alignment tool is intended to fit into the lens mount 6 which is typically a split mounting cylinder having a central cylindrical opening to receive the projection lens assembly. The laser alignment tool has a cylindrical housing 50 having a diameter sized to fit slidably and snugly within the standard diameter lens mount most common in commercial projectors and has a length sized to fit the length of such lens mounts.

A low voltage battery powered laser diode unit 54 is mounted within a suitably-sized central opening in the housing 50. The laser is a semiconductor laser providing a low energy laser beam safe for the human eye to avoid risk of injury to persons using the device. In the preferred embodiment, it is manufactured by Applied Laser Systems of Grants Pass, Oreg., under the model designation VLM2-5RL. The laser operates on a 9 volt transistor battery 56 stored within the housing 50 and connected to the laser. At its forward end, the housing has a reduced diameter boss 60 open through its center. The housing includes conventional internal adjusting devices, such as shims and spacers (not shown) which enable the laser 54 to be adjusted in its positioning within the housing so that the laser beam is precisely aligned with the central axis of the cylinder 50 using conventional calibration techniques and instrumentation. Because of the precise relationship which exists between the laser beam and the center line of the housing, when the housing 50 is slid into the lens mount the laser beam will be precisely aligned with the optical axis of the projection lens assembly when it is returned to its position in the lens mount 6.

The splitting of the laser beam into the center beam and side beams is accomplished by mounting a diffraction grating in the path of the laser beam, connected with the reduced diameter portion 60 of the housing. The diffraction grating produces several pairs of side beams at progressively increasing angles of divergence from the center beam spaced symmetrically on opposite sides of it. Only the pair of side beams closest to the center beam is used for adjustment purposes. The angular inclination of the first side beams to the center beam is dependent upon the number of lines per millimeter of the diffraction grating. In determining what angular inclination is required, it is necessary to perform calculations based on conventional ray path geometry, taking into account the F-number characteristics of the projection lens assembly. For example, in the preferred embodiment, used in conjunction with the standard f/2 lens and collector system, the inventor achieved successful operation using a divergent angle of the first side beams from the center beam of approximately 9.25°, by use of a diffraction grating having a rhonchi ruling, chrome on glass, 240lp/mm, obtainable from Max-Levy Autograph, Inc., Philadelphia, Pa.

In performing the ray path calculations, it is necessary to ensure that the angle of reflection of the side beams from the interior collector surfaces is sufficiently acute to the surface of the intercept sheet 40 that the light spots produced by the side beams will still be sharply defined and circular. If the angle of incidence of the side beams on the collectors is such that the reflected beams strike the intercept surface at a very shallow angle approaching parallelism, the images of the light spots will be too elongated in an oval direction to bring readily into coincidence with the center beam light spot. This condition should not occur with the standard f/2 projection system. If that condition occurs, it will be necessary to use a different diffraction grating to change the angle of the side beams until acceptably sharply defined side beam light spots are obtained on the intercept surface.

Figure 5:
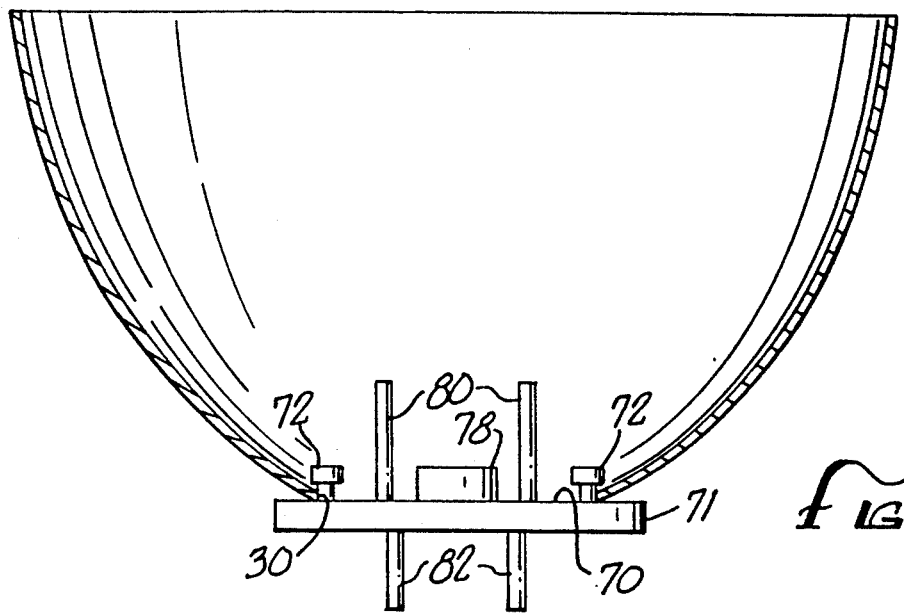
FIG. 5 is a cross-sectional side view showing a releasable target, forming part of the apparatus of the present invention.

In the preferred embodiment, an adjustable target has been used, as shown in FIGS. 5 and 6. The adjustable target uses a disk-like housing 70 having a downwardly-turned peripheral rim 71. The housing supports three equally spaced shoulder pins 72, extending through radially extending slots in the upper surface of the disk 70. The shoulder pins 72 may be moved radially in and out in unison by a control disk 74 mounted for concentric rotation relative to the disk 70. The control disk 74 has three camming slots 76 which engage opposite ends of the shoulder pins 72 to move them radially in or outwardly of the disk. A central hub 78 secures the disk 70 and the control disk 74 together. On its upper surface, the hub 78 bears a cross constituting the marking that is used to center the optical axis of the collector in relation to the light spot produced by the center beam of the laser. To install the target in the opening 30 at the base of the collector, the upper disk 70 and the control disk 74 are rotated relative to each other, by grasping a pair of posts 80 connected to the upper disk and turning them relative to another pair of posts 82 projecting downwardly from the control disk, thereby advancing the shoulder pins 72 outwardly until they grip the edges of the collector.

It will be appreciated that the method and apparatus described provide for adjusting the alignment of projection systems in a manner which is not limited to collectors in which a precise, orthogonal relationship has already been established during manufacture between the plane of the upper edge of the collector and its optical axis and which does not require special different tools for ellipsoid collectors of differing diameter. These results are achieved by apparatus which is relatively inexpensive, easy to use and does not present a health hazard since it uses low energy laser beams that do not require the wearing of safety eye wear.

The invention has been described with reference to a preferred embodiment but it will be appreciated by those skilled in the art that variations may be made without departing from the spirit of the invention defined by the appended claims.

I claim:

1. A method for adjusting the optical alignment of a film projection system having a film gate with a central opening, a lens mount having lenses optically aligned along an optical axis of the lens mount, a light source, a generally ellipsoid collector for reflecting light from the light source along an optical axis of the collector and a folding mirror for reflecting light from the light source and the collector to the gate, the system when correctly adjusted having a system optical axis formed by the optical axes of the collector, the gate and the lens mount in which the film gate opening is centered with respect to the optical axis of the lens mount and the illumination from the light source and collector reflected by the folding mirror is centered on the film gate opening distributed evenly across it, the method comprising the steps of, removing the light source from the collector;

mounting a target adjacent the base of the collector with a center marking on the target centered coincident with the optical axis of the collector;

projecting a laser beam in alignment with the optical axis of the lens mount;

splitting the laser beam into a center beam aligned with the optical axis of the lens mount and at least two side beams equally inclined divergently from the center beam on opposite sides thereof, said center beam being reflected by the folding mirror, the side beams reflecting successively from the folding mirror and from interior reflecting surfaces of the collector;

adjusting the position of the collector in a plane perpendicular to the center beam path to move the center marking of the target into coincidence with a spot of light produced thereon by the center beam reflected from the folding mirror, thereby centering the collector relative to the optical axis of the lens mount;

placing an intercept sheet temporarily in the reflected paths of the side beams from the collector and of the center beam from the folding mirror to create visible side beam light spots and a center beam light spot on the intercept sheet;

adjusting the tilt between the collector and the folding mirror to move the side beam light spots into coincidence with the center beam light spot on the intercept sheet, thereby bringing the optical axis of the collector and the optical axis of the lens mount into coincidence with the system optical path.

2. A method as defined in claim 1 including the preliminary steps of, removing the projection lens from the lens mount;

inserting a laser alignment tool into the lens mount for providing the center and side beams, the center laser beam being aligned with the optical axis of the lens mount;

inserting an aperture blank into the film gate having a center marking aligned with the center of the film gate;

adjusting the position of the lens mount relative to the film gate to center the center laser beam on the center marking of the aperture blank; and removing the aperture blank to enable the center and side beams to pass through the film gate.

3. A method as defined in claim 1 in which the lens mount has a generally cylindrical opening having a central axis aligned with the optical axis of the lens mount and in which the step of projecting a laser beam includes the steps of, providing a laser beam source small enough to be received within a housing insertable into the lens mount;

inserting the housing into the lens mount, with the housing, when received in the lens mount, aligning the laser beam with the optical axis of the lens mount.

4. The method as defined in claim 1 wherein the step of splitting the laser beam includes the following steps:

interposing a beam splitter in the path of the laser beam to split the beam into the center beam and the two side beams with the angle of inclination of the side beams to the center beam being selected for the side beams to be reflected from the interior surfaces of the collector at acute angles to the intercept surface such that the side beam light spots are sufficiently small and well defined to enable them to be moved into coincidence with the spot of light on the intercept surface created by the reflection of the center beam from the folding mirror.

5. A method as defined in claim 4 wherein the beam splitter used in the step of splitting the laser beam is a diffraction grating which produces multiple pairs of side beams spaced symmetrically on opposite sides of the center beam at progressively increasing angles of divergence, and wherein the side beams that are utilized constitute only the pair of side beams closest to the center beam.

6. A method as defined in claim 1 wherein the laser beam is produced by an eye-safe semiconductor laser operated by low voltage battery power.

7. An apparatus for adjusting the optical alignment of a film projection system having a film gate with a central opening, a lens mount having lenses optically aligned along an optical axis of the lens mount, a light source, a generally ellipsoid collector for reflecting light from the light source along an optical axis of the collector, and a folding mirror for reflecting light from the light source and the collector to the gate, the system when correctly adjusted having a system optical axis formed by the optical axes of the collector, the gate and the lens mount in which the film gate opening is centered with respect to the optical axis of the lens mount and the illumination from the light source and collector reflected by the folding mirror is centered on the film gate opening distributed evenly across it, an intercept sheet being temporarily interposed between the folding mirror and the position normally occupied by the light source during use of the apparatus, the apparatus comprising, a target surface releasably mounted to the collector adjacent its base after temporary removal of the light source, said target having a center marking coincident with the optical axis of the collector;

a laser source releasably mounted in the lens mount in place of the projection lens assembly, said laser source projecting a laser beam;

a beam splitter connected with the laser source splitting the beam into a center beam aligned with the optical axis of the lens mount and two side beams inclined at equal angles of divergence from said central beam on opposite sides thereof, said side beams reflecting successively from the folding mirror and from interior reflecting surfaces of the collector, said center beam being reflected by the folding mirror to create a center beam light spot on said target, adjustment of the collector relative to the folding mirror in a plane perpendicular to the center beam moving said center marking on said target into alignment with said center beam light spot to center the collector relative to the optical axis of the lens mount; and the intercept sheet being temporarily positioned to intercept said center beam and produce a center beam light spot thereon; said side beams, subsequent to their reflection by the collector, producing side beam light spots on the intercept sheet;

tilting adjustment of the collector relative to the folding mirror bringing said side beam light spots into coincidence with said center beam light spot on the intercept sheet thereby bringing the optical axis of the collector and the optical axis of the lens mount into coincidence with the system optical path.

8. An apparatus as defined in claim 7 wherein said laser source further includes,
a laser for producing the laser beam,
a housing shaped to fit slidably within the lens mount, said housing engaging said laser to support it in position to direct the laser beam in alignment with the optical axis of the lens mount when said housing is fitted into the lens mount.

9. An apparatus as defined in claim 7 wherein the angle of inclination of said side beams to said center beam is selected to position said side beams to be successively incident upon, and reflected from, the folding mirror and interior surfaces of the collector at an angle acute to said intercept surface to cause said side beam light spots to be sufficiently small and well defined on said intercept surface that they can be moved into coincidence with said center beam light spot on the intercept surface upon tilting movement of the folding mirror and the collector relative to each other.

10. An apparatus as defined in claim 7 wherein said beam splitter comprises a diffraction grating placed in the path of said beam for producing multiple pairs of side beams at progressively greater inclinations symmetrically on opposite sides of the center beam, only the first pair of side beams being utilized to produce said side beam light spots on the intercept surface.

11. An apparatus as defined in claim 8 wherein said laser comprises a battery powered semiconductor laser diode for producing an eye-safe laser beam; and a battery positioned within said housing connected to said laser to provide power therefor.

12. A method for adjusting the optical alignment of a film projection system having a film gate with a central opening, a lens mount having lenses optically aligned along an optical axis of the lens mount, a light source, a generally ellipsoid collector for reflecting light from the light source along an optical axis of the collector, the system when correctly adjusted having a system optical axis formed by the optical axes of the collector, the gate and the lens mount in which the film gate opening is centered with respect to the optical axis of the lens mount and the illumination from the light source and collector is centered on the film gate opening distributed evenly across it, the method comprising the steps of,
removing the light source from the collector;
mounting a target adjacent the base of the collector with a center marking on the target centered coincident with the optical axis of the collector;
projecting a laser beam in alignment with the optical axis of the lens mount;
splitting the laser beam into a center beam aligned with the optical axis of the lens mount and at least two side beams equally inclined divergently from the center beam on opposite sides thereof, said center beam being reflected by the folding mirror;
adjusting the position of the collector in a plane perpendicular to the center beam path to move the center marking of the target into coincidence with a spot of light produced thereon by the center beam reflected from the folding mirror, thereby centering the collector relative to the optical axis of the lens mount, the side beams reflecting from interior reflecting surfaces of the collector;
placing an intercept sheet temporarily in the reflected paths of the side beams from the collector and of the center beam to create visible side beam light spots and a center beam light spot on the intercept sheet;
adjusting the tilt of the collector to move the side beam light spots into coincidence with the center beam light spot on the intercept sheet, thereby bringing the optical axis of the collector and the optical axis of the lens mount into coincidence with the system optical path.

* * * * *